(No Model.)

J. W. McKAY.
COMBINED PLANT SETTER AND SEED PLANTER.

No. 450,946. Patented Apr. 21, 1891.

Witnesses
Thos Houghton
Frank S. Arnold

Inventor
John W. McKay
By D. A. McKnight,
his Attorney

UNITED STATES PATENT OFFICE.

JOHN W. McKAY, OF LYNCHBURG, VIRGINIA, ASSIGNOR TO THE McKAY PLANT SETTER MANUFACTURING COMPANY OF VIRGINIA.

COMBINED PLANT-SETTER AND SEED-PLANTER.

SPECIFICATION forming part of Letters Patent No. 450,946, dated April 21, 1891.

Application filed January 2, 1891. Serial No. 376,556. (No model.)

*To all whom it may concern:*

Be it known that I, JOHN W. McKAY, a citizen of the United States, residing at Lynchburg, in the county of Campbell and State of Virginia, have invented certain new and useful Improvements in a Combined Plant-Setter and Seed-Planter; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
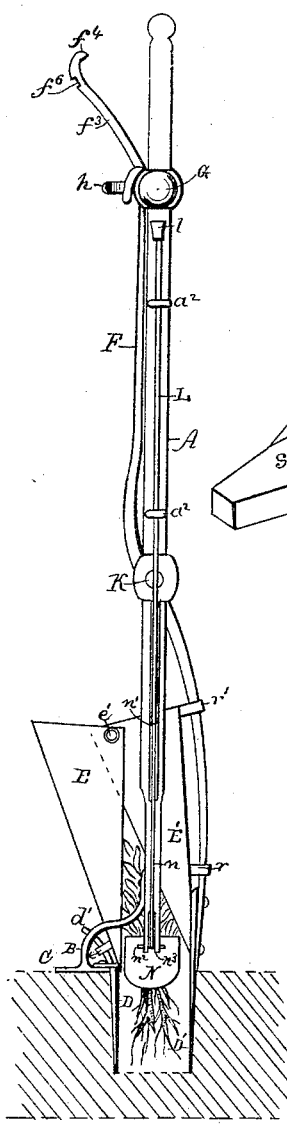
Figure 4:
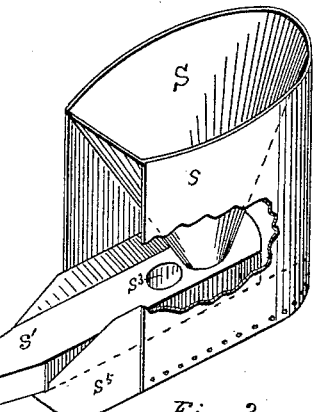
Figure 3:
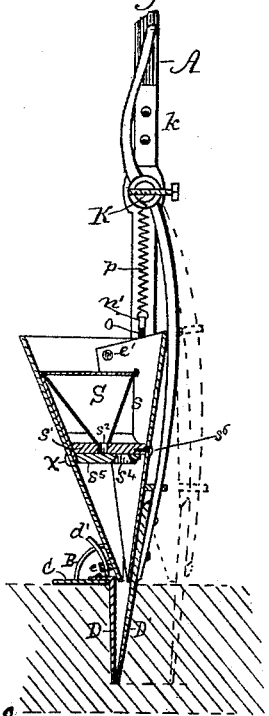
Figure 2:
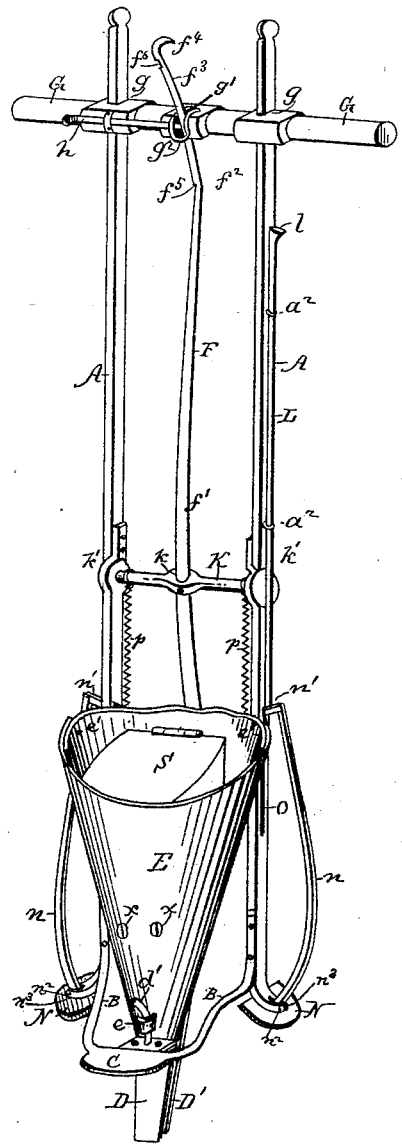

Figure 1 is a side elevation of a plant-setter embodying my invention. Fig. 2 is a perspective view of the same with the seed-dropper in place. Fig. 3 is a vertical section of the lower part of Fig. 1. Fig. 4 is a perspective view of the seed dropper detached.

My invention relates, first, to improvements in plant-setters, whereby a maximum of efficiency is obtained by a minimum of power, and consists in a novel adaptation of the parts of the machine to secure said end, and, second, to a combined plant-setter and seed-planter, which consists in a novel arrangement and attachment of the seed-dropper to the plant-setter.

In the annexed drawings, the letters A A designate the two main supports of the machine, which are united at the top by the movable cross-handle G, passing through the slots $g\ g$ therein, and at the bottom by the forwardly-curved and fixed bar B. I prefer to construct these supports in two pieces suitably joined at $k'$. At the middle of bar B is the plate C, which limits the depth to which the cutters D and D' penetrate the soil.

D is a stationary cutter firmly attached to the rear of plate C and parallel to the plane of the supports A A.

D' is a movable cutter firmly attached to the lower end of the lever F and making an angle with the plane of the supports A A when the cutters are closed, so that they shall then form a wedge, as shown in Fig. 3, and shall be parallel when fully opened, as shown in Fig. 1. These properties of the cutters are of prime importance in facilitating their penetration of the soil and their proper withdrawal when the plant is set.

E is the front jaw, and E' the rear jaw, of the plant-holder, which are hinged near the top at $e'\ e'$, and which form a funnel-shaped hopper when closed. The rear jaw is suitably fastened at $r\ r'$ to the lever F, and the front jaw is fastened to the bar B by the curved pin $d'$, which rises from the rear part of the plate C and passes through the loop $e$, attached to the lower part of said jaw.

Lever F, which is the chief operative part of the machine, is situated midway between the supports A A, its upper end passing through the notch $g'$ in the cross-handle G and being held in place by the loop $g^2$, attached to said cross-handle. Pivotally attached to the supports A A is the rock-shaft K, to the middle of which at $k$ is firmly fastened lever F. At $f'$ lever F curves backward and at $r'$ it again curves forward, and these curves are nicely adjusted in order to effectuate the following results: first, that when the cutters are closed pressure on the lever at $f^4$ shall be substantially in the plane of A A, thus increasing the penetrative power; second, that the lever shall be adapted to the shape of the rear jaw of the plant-holder; third, that the prolongation of its extremity by the cutter D' shall with the cutter D form a wedge when the cutters are closed, and, fourth, that when the cross-handle is at the point $f^2$ the cutters shall be fully open and parallel. Between $f'$ and $f^2$ lever F is substantially straight, so that the further downward movement of the cross-handle (to be hereinafter explained) will not disturb the parallelism of the cutters. At the upper extremity of lever F is the hook $f^4$, with which the cross-handle engages when the cutters are closed. At $f^2$ lever F is bent forward at an angle, which is exactly proportioned to the distance between the cutters when fully opened, and the pressure of the cross-handle as it moves from $f^4$ to $f^2$ opens the cutters. To increase the pressure power that part of the lever between $f^2$ and $f^4$ is slightly curved. At $f^6$ is a shoulder with which the spring-actuated bolt $h$ engages when the cutters are closed, thus aiding their penetration when power is applied to the top of the cross-handle, and at $f^5$ is a similar shoulder, with which said bolt engages when power is applied beneath the cross-handle, whereby the cutters are removed from the soil without disturbing their parallelism.

At their lower extremities the supports A A bend outward and have the jaws $n^3$, between which pass the stems $n\ n$ of the shovels or coverers N N, being held in place by the pins $n^2$. The upper ends of these stems are bent at an angle and pass through the slots $o\ o$ in the supports A A, and their inner extremities are connected by springs $p\ p$ to the rock-shaft K. The said stems are curved and the degree of curvature, coupled with the length of the slots, regulates the direction of motion of the shovels and the space between them when pushed fully downward. The shovels are pressed down by the rods L L, which rest upon $n'\ n'$. These rods move in the eyes $a^2\ a^2$, attached to supports A A, and are forced downward by the pressure of the cross-handle G upon their heads $l\ l$.

In operating the plant-setter the plant is placed in the plant-holder root downward, and the cross-handle G being at $f^4$, the cutters are thrust into the soil until checked by the plate C. At the same instant the spring-bolt $h$ is disengaged from the shoulder $f^6$, the cross-handle is pushed downward to $f^2$, thus forcing the cutters open, pushing back the soil and opening the jaws of the plant-holder, and the plant drops into the hole. By pushing the cross-handle farther downward the shovels are forced down and press the soil around the root of the plant. The cross-handle is then raised, the shovels are retracted by the springs $p\ p$, and the spring-bolt $h$, engaging with the shoulder $f^5$, lifts the setter out of the hole. The spring-bolt is then disengaged, the cross-handle engages with the hook $f^4$, and the machine is ready for another plant.

Proportioned and arranged as herein shown and described, my invention is adapted to either a compact or a loose soil and to either a level or an irregular surface, and it sets the plant in a most perfect form and most completely covers up and protects the roots; but its power and efficiency in these respects are directly dependent upon the novel shapes which I have given to the several parts of the machine.

In the drawings, S designates the funnel-shaped hopper of the seed-dropper; $s$, its surrounding wall or support, and $s^5$ its bottom, having the hole $s^4$ in it and detachably fastened at $x\ x$ to the front jaw E of the plant-holder. $s'$ is a slide moving in a groove of the bottom $s^5$, having the hole $s^3$ in it conforming in size to the bottom opening $s^2$ of the hopper and detachably fastened at $s^6$ to the rear jaw E' of the plant-holder. The size of the bottom hole of the hopper and of the hole in the slide regulates the quantity of the seed which shall be discharged. In operation the hole $s^3$ is directly beneath the hole $s^2$, when the cutters D and D' are closed, and the seed being placed in the hopper S fills up the hole $s^3$. When the cutters are opened, the lever F retracts the slide $s'$ and the seed is discharged through the opening $s^4$ into the hole in the soil made by the cutters, where it is covered by the shovels N N, as hereinbefore described.

It is obvious that the seed-dropper may be readily attached to and detached from the plant-setter ordinarily by screws, as shown in the drawings, and that the plant-setter is quickly converted into a seed-planter, when desirable, without any change in or removal of its parts.

Having thus fully described my invention, what I claim, and desire to secure by Letters Patent, is—

1. A plant-setter consisting of two upright supports bearing the side shovels, and the actuating rods and springs joined at the top by a movable cross-handle and at the bottom by a forwardly-curving bar having a plate, a cutter, and the front jaw of a plant-holder attached to it, and having midway between them a lever attached to and moving on a rock-shaft and carrying at its lower end a cutter and the rear jaw of the plant-holder, which is hinged to the front jaw at the top, said lever having a bottom forward curve, a central backward curve, and its upper end bent forward at an angle and curved, terminating in a hook and having two shoulders which engage with a spring-actuated bolt attached to the cross-handle, substantially as shown and described.

2. The combination, with the supports, cross-handle, shovels, cutters, rock-shaft, and hopper of a plant-setter, of a lever between the supports, having its upper section bent forward at an angle and curved and two shoulders on one side, its next lower section straight, its next lower section curved backward, and its lowest section curved forward, substantially as shown and described.

3. A combined plant-setter and seed-planter consisting of a seed-dropper within and detachably fastened to the front and rear jaws of the plant-holder, substantially as shown and described.

In testimony whereof I affix my signature in presence of two witnesses.

JOHN W. McKAY.

Witnesses:
FRANK S. ARNOLD,
ROBT. V. HUGHES.